United States Patent
Graber

(10) Patent No.: US 6,182,552 B1
(45) Date of Patent: Feb. 6, 2001

(54) HOLDING DEVICE FOR A CAGE FOR ROLL BODIES ON A PILLAR OF A TOOL

(75) Inventor: Martin Graber, Büren a/Aare (CH)

(73) Assignee: Agathon AG Maschinenfabrik, Solothurn (CH)

( * ) Notice: Under 35 U.S.C. 154(b), the term of this patent shall be extended for 0 days.

(21) Appl. No.: 09/113,875

(22) Filed: Jul. 10, 1998

(30) Foreign Application Priority Data

Jul. 29, 1997 (EP) .................................................. 97810543

(51) Int. Cl.⁷ ..................................................... F16C 21/00
(52) U.S. Cl. ................................................. 83/821; 384/30
(58) Field of Search ........................... 83/824, 825, 821, 83/828, 829, 133, 142, 143, 527, 523, 30, 16, 46, 51, 265, 267; 280/86.757; 384/527, 523, 30, 16, 46, 51, 265, 267

(56) References Cited

U.S. PATENT DOCUMENTS

| | | |
|---|---|---|
| 3,469,894 | 9/1969 | Stamm . |
| 3,763,732 * | 10/1973 | Stursberg ................................ 83/821 |
| 3,847,049 * | 11/1974 | Bitzel ..................................... 83/821 |
| 4,947,718 * | 8/1990 | Whistler ................................ 83/143 |
| 4,989,484 * | 2/1991 | Johnson et al. ........................ 83/143 |
| 4,998,958 * | 3/1991 | Chun et al. ............................ 83/133 |
| 5,044,239 * | 9/1991 | Endo et al. ............................ 83/133 |
| 5,214,991 * | 6/1993 | Shimizu et al. ....................... 83/824 |

FOREIGN PATENT DOCUMENTS

| | | |
|---|---|---|
| 755988 | 5/1952 | (DE) . |
| 2275976 | 1/1976 | (FR) . |

* cited by examiner

*Primary Examiner*—Rinaldi I. Rada
*Assistant Examiner*—Omar Flores-Sánchez
(74) *Attorney, Agent, or Firm*—Pearne, Gordon, McCoy & Granger LLP

(57) ABSTRACT

A holding device for a cage for roll bodies of longitudinal leaders on pillars of a tool, in particular a blanking or punching die or a mould, the tool consisting of a plurality of assembled plates, and having at least a first part and a second part. The holding device comprises a holding part which includes a hollow cylindrical rod, held displaceably in a longitudinal bore made on the free end of each pillar. Said rod is provided on its face with a disk projecting beyond the circumference of the pillar. Also inserted into the longitudinal bore is a screw. Provided on the shank of said screw is an elastic element over which an annular element, inserted into the hollow cylindrical rod, is pushed when the holding part is in pushed-in position. The elastic element holds the annular element in this position in a firmly clamping fashion. The disk in this position prevents the cage from being able to move out beyond the end of the pillar and be damaged, in particular when the tool is tilted with respect to the pillars.

7 Claims, 2 Drawing Sheets

HOLDING DEVICE FOR A CAGE FOR ROLL BODIES ON A PILLAR OF A TOOL

BACKGROUND OF THE INVENTION

This invention relates to a holding device for a cage for roll bodies of longitudinal leaders on guide pins or pillars of a tool, the tool comprising a plurality of plates put together and made up of at least a first part and a second part, in particular a blanking or punching die or a mould, in which the first part bears the pillars which are led in corresponding guides in the second part by means of roll bodies held in cages so that a working stroke can be achieved with the first part in relation to the second part, which holding device comprises in each case a holding part which consists of a rod held displaceably in a longitudinal bore made on the free end of the pillar, which rod is provided with a disk projecting beyond the circumference of the pillar, and whose displacement path is limited by stops.

In tools of this kind the first part, which bears the pillars, can be separated from a second part, which is provided with corresponding guides for receiving the pillars in which the pillars are led, for example, by means of ball bearings in cages. To ensure that the ball bearing cages remain at least partially fixed on the pillars, particularly when the first part can be lifted vertically out of the second part of the tool, holding devices are provided in a known way. With these devices the ball bearing cage is prevented from coming completely out of the pillar.

Usually this first tool part containing the pillars is put down on a base at least temporarily in such a way that one edge of the plate bearing the pillars and the end areas of the two pillars remote from the plate rest on this base. If the ball bearing cage projects far beyond the pillar, the cage can thus be damaged, especially when tilted or exposed to blows.

SUMMARY OF THE INVENTION

The object of the present invention is therefore to design the holding device in such a way that the cage for roll bodies can be pushed completely onto the pillar when the tool parts are separated, and can be kept in this position by the holding device. In addition, the cage should be able to be brought into the moved-out position again without any great effort, where it is once again held by the holding device, which is necessary for insertion of the respective pillars into the guides.

This object is achieved according to the invention by means of a retention element which holds the holding part in a releasable fashion in the position where it is pushed into the pillar.

The retention element preferably consists of an elastic element which is disposed in the longitudinal bore of the pillar. The rod can then be brought into the completely pushed-in position, which is achieved with a slight pressing. In this position the rod is held firmly by the elastic element in a clamping way. The holding part can be released from this holding position by pulling.

In a preferred embodiment of the holding device, the rod of the holding part is designed hollow cylindrical and a screw can be screwed into the longitudinal bore of the pillar, the head of which serves as a stop for an annular element provided inside the hollow cylindrical rod, and which sets the pulled-out position of the holding part. By suitable selection of the length of the screw, and depending upon how deeply the screw is screwed into the longitudinal bore, the stop setting the pulled-out position of the holding part can be adjusted.

The elastic element is preferably designed as a spring bushing which can be inserted into a recess provided in the region of the screw remote from the head. The annular element of the hollow cylindrical rod of the holding part can be pushed over this spring bushing until the pushed-in position is reached, a clamping hold being achieved. In this way a simple and optimal holding of the holding part in the pushed-in position can be ensured.

The disk of the holding part has preferably cut-outs, only the areas of the disk situated between the cut-outs protruding beyond the circumference of the respective pillar. Since the disk is rotatable with respect to the corresponding pillar about the longitudinal axis, the disk can be turned in such a way that a cutout of the disk is opposite the base when the respective tool part with the pillars is put down on a base. In this way it can be prevented that the weight of the tool part, upon tilting, is absorbed by the disk, thus damage to the disk can also be excluded.

An embodiment of the holding device according to the invention will be explained more closely in the following, with reference to the attached drawing:

DETAILED DESCRIPTION OF THE INVENTION

Figure 1:
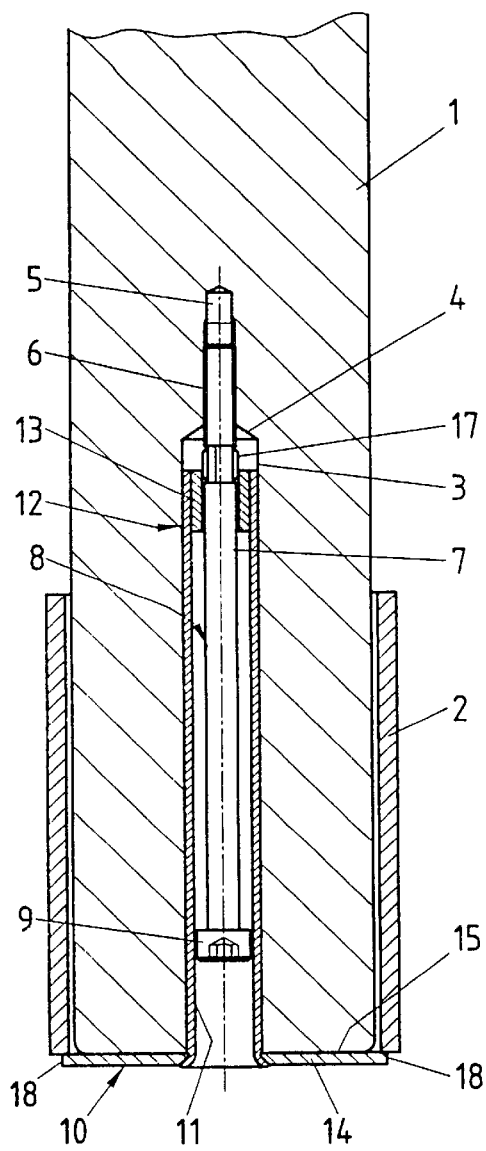
FIG. 1 is a longitudinal section through a pillar with the ball bearing cage completely pushed-on and with the holding device according to the invention in the pushed-in position.

Shown in section in FIG. 1 is the free end region of a pillar 1 of a respective tool. Pushed onto this pillar 1 is a pin or cage, which is designed in this embodiment as a ball bearing cage 2 and which is shown schematically. In a known way this cage contains ball bearings (not shown) for play-free guiding of the pillar in a corresponding guide in the base of a tool. From the free end of the pillar 1 a longitudinal bore 3 is provided, running coaxial to the pillar 1. The longitudinal bore 3 is provided at its bottom 4 with an extension bore 5 which has a smaller diameter than the longitudinal bore 3, and which is provided with a threaded part 6.

Screwed into the threaded part 6 is a screw 8 having a shank 7; with a head 9.

Also inserted into the longitudinal bore 3 is a holding part 10, which has a hollow cylindrical rod 11 into which the screw 8 comes to lie. An annular element: 13 is inserted on the inside in the end region 12 of the hollow cylindrical rod 11 projecting into the longitudinal bore 3.

Fixed to the end opposite the end region 12 of the hollow cylindrical rod 11 is a disk 14, which comes to abut the front face 15 of the pillar 1 when the holding part 10 is fully pushed into the longitudinal bore 3, as is shown in FIG. 1.

Provided in the region of the shank 7 of the screw 8 adjacent to the threaded part 6 is an annular recess 16 (FIG.

4) into which a spring bushing 17 is inserted. When the holding part 10 is pushed into the pillar 1, as is shown in FIG. 1, the annular element 13 is pushed at least partially over the spring bushing 17; the spring bushing 17 thus holds the annular element 13 and consequently the holding part 10 in the pushed-in position, shown here, in a firmly clamping way.

The disk 14, which has on its circumference regions 18 which project beyond the pillar 1, keeps the ball bearing cage 2 completely pushed onto the pillar 1, the position shown in FIG. 1.

Figure 2:
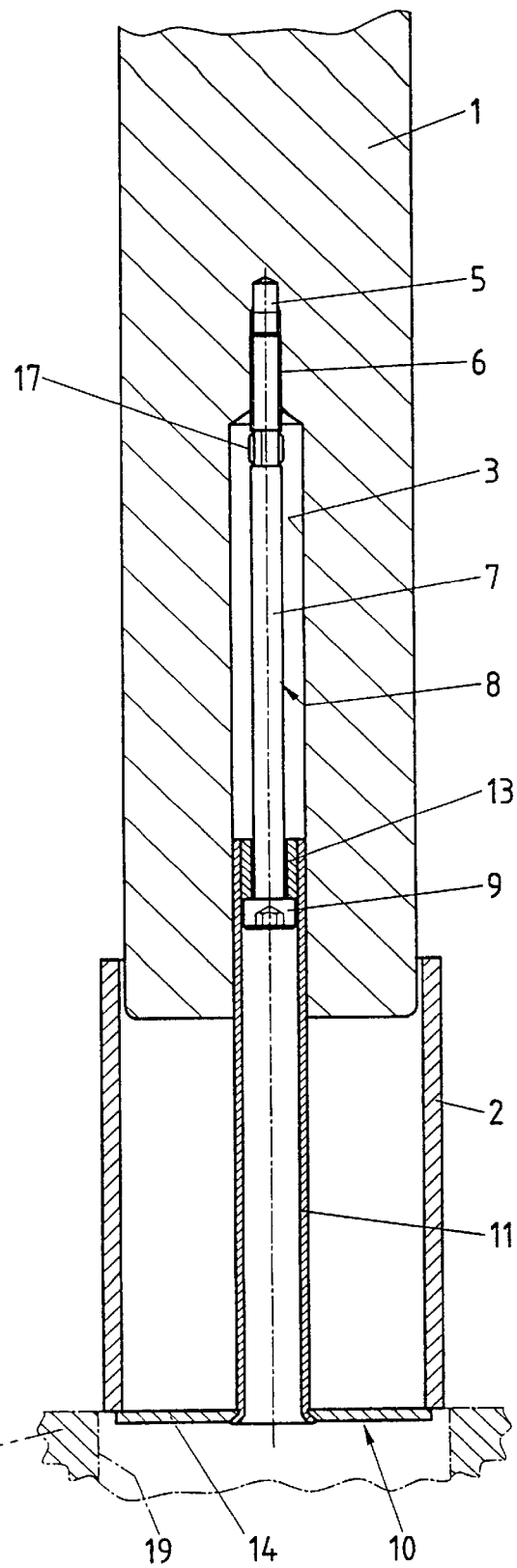
FIG. 2 is a longitudinal section through the pillar according to FIG. 1 with the holding device according to the invention in the completely moved-out position and with the ball bearing cage moved out.

The holding part 10 is shown in the completely moved-out position in FIG. 2. The hollow cylindrical rod 11 of the holding part 10 has been shifted outwards along the longitudinal bore 3 and the screw 8 inserted therein until the annular element 13 abuts the head 9 of the screw 8. Thus the head 9 of the screw 8 serves as the stop limiting the fully pulled-out position of the holding part 10. The ball bearing cage 2 can now be displaced along the pillar 1 until it is held by the disk 14 of the holding part 10. The ball bearing cage 2 also assumes this position when it is moved completely out of the guide 19 of the base 20 of the tool. The ball bearing cage 2 can then be brought into the pushed-in position, shown in FIG. 1, in which it is held by the holding part 10 and the spring bushing 17. One pull on the holding part 10 suffices to release it from the hold of the spring bushing 17, so that the position shown in FIG. 2 can be reached again, the position the ball bearing cage 2 must assume so that the pillar 1 can be moved into the guide 19 and the ball bearing cage ends up in the correct guide position.

Figure 3:
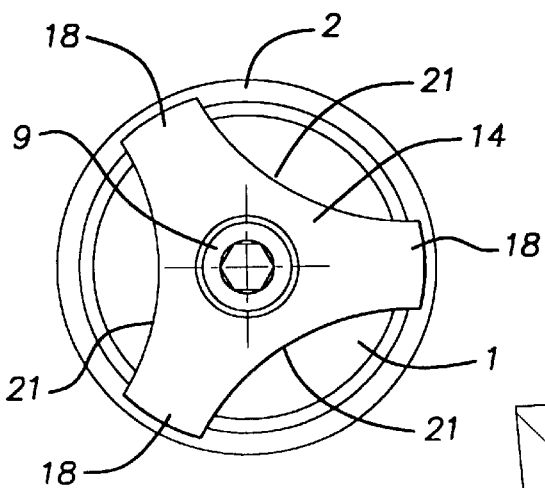
FIG. 3 is a view from below of the inventive device according to FIG. 1.

As can be seen from FIG. 3, the disk 14 which holds the ball bearing cage 2 on the pillar 1, has cut-outs 21. Thus only regions 18 protrude beyond the circumference of the pillar 1. Therefore when the tool is put down on the pillars 1 on a base, and before the tool is tilted with respect to the two pillars 1 and tilted over, the disk 14 can be rotated in such a way that the bearing point of the pillar 1, or respectively of the ball bearing cage 2, is situated in a cut-out 21 when the pillar 1 or respectively ball bearing cage 2 is tilted on the base. In this way the disk is prevented from having to absorb the entire weight of the tool, which could result in damage to the disk 14.

Figure 5:
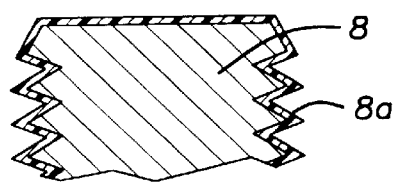
FIG. 5. is an enlarged fragmentary, sectional view of the screw end.
Figure 4:
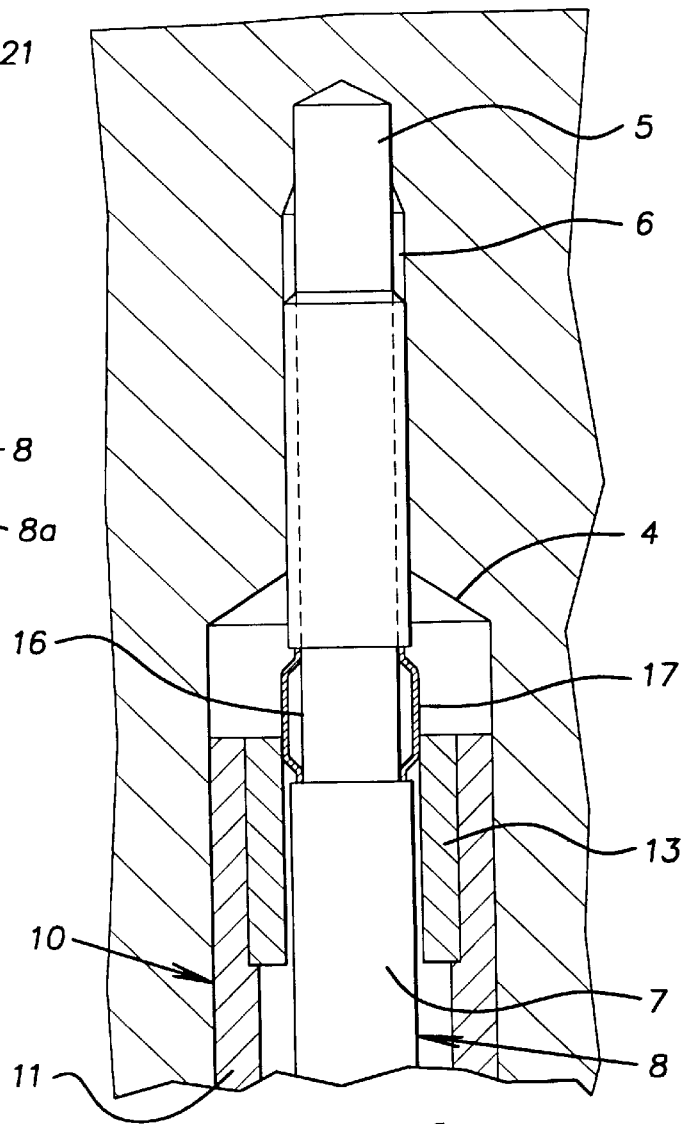
FIG. 4 shows enlarged the rear end region of the longitudinal bore in the pillar according to FIG. 1.

FIG. 4 shows enlarged a detail of the rear region of the longitudinal bore 3 according to FIG. 1. Particularly visible here is the annular recess 16 provided on the shank 7 of the screw 8, and in which the spring bushing 17 is inserted. The spring bushing 17 is an ordinary component, which is sold, for example, under the German name "Star-Toleranzringe". The screw 8 is screwed into the threaded part 6 of the extension bore 5. As may be seen in FIG. 5, to prevent this screw from coming loose during operation of the tool, the screw is provided with a screw locking device which consists of a plastic covering 8a put on the screw which can be released repeatedly. In this enlarged detail it can also be seen how the annular element 13, which is inserted into the hollow cylindrical rod 11 of the holding part 10, is held in a clamping fashion by the spring bushing 17.

Achieved with this holding device according to the invention for a cage of a roll body on a pillar of a tool, the tool comprising a plurality of plates put together and made up of a first part and a second part, is that during installation, disassembly or alteration of the tool, the cages 2 on the pillars 1 are protected from damage in an optimal way. At the same time the handling is very simple.

What is claimed is:

1. A holding device for a bearing cage surrounding a longitudinal guide pin of a tool having first and second relatively moveable parts, said pin being attached to said first part and being adapted to be received in a guide socket provided in said second part, said pin being guided in said socket by said bearing cage, said pin having a longitudinal bore, a rod reciprocal in said bore and having a radially extending disk at a distal end supporting said bearing cage, said rod being reciprocal between a first position wherein said rod is retracted in said bore and said bearing cage surrounds said pin and a second position wherein said rod projects from said pin and said a major portion bearing cage is longitudinally displaced from a surrounding relationship with said pin, and a releasable retention element between said rod and said bore adapted to releasably retain said rod and said bearing cage in said first position.

2. Holding device according to claim 1, wherein the retention element consists of an elastic element which is disposed in the longitudinal bore of the pin, and which holds the rod of the holding part firmly in the pushed-in position in a clamping fashion.

3. Holding device according to claim 1 wherein said rod is hollow, an annular element within said rod at a proximal end thereof and a screw axially threaded into an extension bore at an end of the longitudinal bore in the pin, a head of said screw comprising a stop for the annular element and fixes said second position of the rod.

4. Holding device according to claim 3, wherein an annular recess is provided in the region of the screw remote from the head, and the elastic element is a spring bushing in said recess which retains the annular element and the rod in said first position.

5. Holding device according to claim 3, wherein the head of the screw is adjustable by means of the screw-in depth and/or the length of the screw, and the screw is provided with a screw locking device.

6. Holding device according to claim 1, wherein the disk of the pin has cut-outs, so that only the regions of the disk situated between said cut-outs project beyond the circumference of the respective pin.

7. Holding device according to claim 6, wherein the disk is rotatable with respect to the corresponding pin about the longitudinal axis thereof.

* * * * *